United States Patent [19]

Tashiro et al.

[11] Patent Number: 4,651,317
[45] Date of Patent: Mar. 17, 1987

[54] TIME DIVISION MULTIPLEX DATA TRANSMISSION SYSTEM

[75] Inventors: Korefumi Tashiro, Hitachi; Kunio Saito; Hiroshi Sato, both of Katsuta; Takamasa Hori, Ibaraki, all of Japan

[73] Assignee: Hitachi, Ltd., Tokyo, Japan

[21] Appl. No.: 555,214

[22] Filed: Nov. 23, 1983

[30] Foreign Application Priority Data

Nov. 24, 1982 [JP] Japan ................. 57-206357

[51] Int. Cl.⁴ .................. H04J 3/00; B61L 15/00
[52] U.S. Cl. ...................................... 370/86
[58] Field of Search ............ 370/99, 85, 86, 89; 340/870.13, 52 R, 47, 48

[56] References Cited

U.S. PATENT DOCUMENTS

| | | | |
|---|---|---|---|
| 3,814,861 | 6/1974 | Robbins | 370/85 |
| 3,898,373 | 8/1975 | Walsh | 370/85 |
| 4,090,173 | 5/1978 | Sibley | 375/58 |
| 4,166,272 | 8/1979 | Deck | 375/51 |

FOREIGN PATENT DOCUMENTS 2041592 9/1980 United Kingdom .

OTHER PUBLICATIONS

Koninklijk Instituut van Ingenieurs, Belgisch Instituut van Regeltechniek en Automatisme en Nederlanos Instituut van Register Ingenieurs; "Remote Control of the Gurreh Crupe Pumping Station in Iran"; Geleen; 9-3-0-71 to 10-1-71; pp. 37-50.

Primary Examiner—Douglas W. Olms
Assistant Examiner—Frank M. Scutch, III
Attorney, Agent, or Firm—Antonelli, Terry & Wands

[57] ABSTRACT

A time division multiplex data transmission system. A particular time slot among those for data transmission is placed with alternation of different data modes such as "1" and "0" in a commanding station destined for issuing commands. The alternation of data modes is supplied to receiver stations together with other data. When alternation of data modes is detected at the particular time slot in the receiver station, the reception of one command signal from the commanding station is confirmed, while detection of disappearance of the alternation of data modes indicates other command. Since a fault in the data transmission system results in generation of a fixed data mode or level such as "1" or alternatively "0", the alternation of data modes and disappearance thereof can define the commands discriminatively from the state brought about by the fault. Fail-safe feature can thus be realized.

22 Claims, 16 Drawing Figures

TIME DIVISION MULTIPLEX DATA TRANSMISSION SYSTEM

The present invention relates to an improvement of a time division multiplex data transmission system. More particularly, the invention concerns a data transmission system which is suited for use in plants and transport facilities in which signals requiring failsafeness are transmitted along with other signals or data.

In the technology of miniature-type electronic instruments or devices inclusive of micro-computers in recent years, the data transmission network heretofore employed mainly in conjunction with large-scale computer systems tends to be widely used for small-scale computer systems.

In the present state of the technology, data handled by the data transmission network includes a wide variety of signals inclusive of control command signals for remote control of instruments and/or machines installed in the field in addition to data for messages.

By making use of a time division multiplex transmission path, i.e. a serial data transmission path, a large amount of signal conductors or wires can be replaced by one or two coaxial cables, optical fiber cables or a wireless transmission path. Further, in view of the fact that the multiplicity of signals can be increased very easily, there are great demands for the transmission of many kinds of signals through the data transmission network in a system including a large number of instruments and machines such as plants and transport facilities.

In this connection, it is noted that there exists in many systems signals which require fail-safe processing, providing a great obstacle in realizing the signal wirings in a network.

By taking as example a data transmission system for a train, it will be obvious that the train should be prevented from starting when any one of passenger's doors of the cars of the train is left open. Besides, the train must be stopped when a door should be unintentionally opened in the course of running of the train. Otherwise, danger would be involved. Under the circumstances, the signals representative of the opened and closed states of all the doors are transmitted to a particular car in which a main control apparatus is installed. In this system, a situation must be positively prevented in which an abnormality or fault which occurred in the data transmission system gives rise to the transmission of a signal which erroneously indicates the closed state of the doors notwithstanding the fact that a door is open. To this end, the data transmission system has to be arranged such that the signal indicative of the opened-door state is sent to the main control apparatus independent of actual states of the doors when some abnormality occurs in the data transmission system.

Similarly, in conjunction with the transmission of signals commanding the braking of the cars from the main control apparatus to the individual cars through the data transmission path, the relevant data transmission system has to be arranged such that the braking command signal be issued without fail when an abnormality occurs in the data transmission system.

The above are a few examples of the fail-safe features as required in many systems. To realize the fail-safe features or fail-safeness, there have been heretofore adopted the following measures:

1. Addition an error check code:
2. Two successive transmissions with inversion in one transmission;
3. Transmission of an acknowledging signal from a receiver station to a transmitting station; and
4. Duplication of transmitting system and transmission path.

Although the above mentioned measures for assuring the fail-safeness are certainly effective for increasing the reliability of data being transmitted, it is impossible to assure the fail-safeness for the whole hardwares inclusive of ports for receiving commands from peripheral devices of the command issuing station to the terminals to which the command for peripheral devices of a receiver station is outputted.

This is because major parts of the transmission control elements and peripheral circuit components are constituted by semiconductor devices or elements whose faults can not be previously identified discriminatively. In other words, contrary to a relay contact, the probability of fault of a semiconductor element which involves the output of a logic "1" signal is the same as the probability of a fault resulting in the output of a logic "0".

An object of the present invention is to provide a data transmission system for transmitting a plurality of data on a time division multiplex basis in which data can be transmitted while assuring the fail-safeness in the data transmission path.

According to one aspect of the present invention, a particular time slot for data transmission on a time division multiplex basis is provided with a predetermined alternation of data modes relating to the frequency at which the particular time slot appears to thereby allow one of the binary information to be transmitted among stations, while the other one of the binary information is made available for the transmission by stopping the predetermined alternation.

As an example of a manner in which the invention may be carried out, a plurality of data are transferred among transmitter/receiver stations on the basis of conventional time division multiplex operations by utilizing the time slots of each data frame except for a particular time slot. When a dangerous command, such as a brake releasing signal which involves danger is to be transmitted, by way of example, a particular sending station (which may be referred to as the command issuing station or commanding station) assigns alternation of data modes, e.g. alternation of logical codes "1" and "0" to a particular time slot allotted for transmission of the brake releasing signal every time the particular time slot makes an appearance. On the other hand, the receiver station (also referred to as the commanded station) can receive the brake releasing signal by detecting the alternation of the data modes at the particular time slot of the received data. When a safe command, such as a braking command which involves no danger, is to be sent out by the command issuing station, alternation of the data "1" and "0" occurring at every particular time slot is stopped. Then, the commanded station can receive the braking command signal by detecting the absence or disappearance of the alternation of the data modes.

In this conjunction, it should be noted that occurrence of any abnormality at any location on the path extending from the commanding station to the receiver station will scarcely involve the possibility that predetermined alternation of data mode might make appearance at the particular time slot. In such situation, the data will usually be fixed at level "1" or alternatively at "0".

In this way, with the arrangement mentioned above, the commanded or receiver station is at the same state as if a safe command is received even when an abnormality should occur at any locations on the transmission path between the commanding and the commanded stations. In other words, the fail-safe feature can thus be realized.

According to another aspect of the present invention, the predetermined alternation of data mode is imparted to the particular time slot of the data transmitted on a time division multiplex basis in response to a circulation of the data transmitted through a looped transmission path, to thereby allow one of the binary information (e.g. dangerous information or the like) to be transferred between or among the stations, while the other of the binary information (e.g. safe information or the like) can be transmitted by extinguishing the predetermined data alternation.

With the arrangement mentioned above, the particular time slot is imparted with the predetermined alternation of data only when the particular time slot has been fed back to the commanding station after having been transmitted through all the individual stations by way of the looped transmission path. This alternation of the data mode is extinguished without fail when a fault takes place even in a terminal element of the data transmission network. In this way, the fail-safe feature can be realized in a completely satisfactory manner.

Above and other objects, features and advantages of the invention will be more apparent from the following description taken in conjunction with the accompanying drawings, in which:

FIG. 4 is a view showing an arrangement of a data transmission system according to a basic embodiment of the invention in which a particular time slot is made use of;

Figure 1:
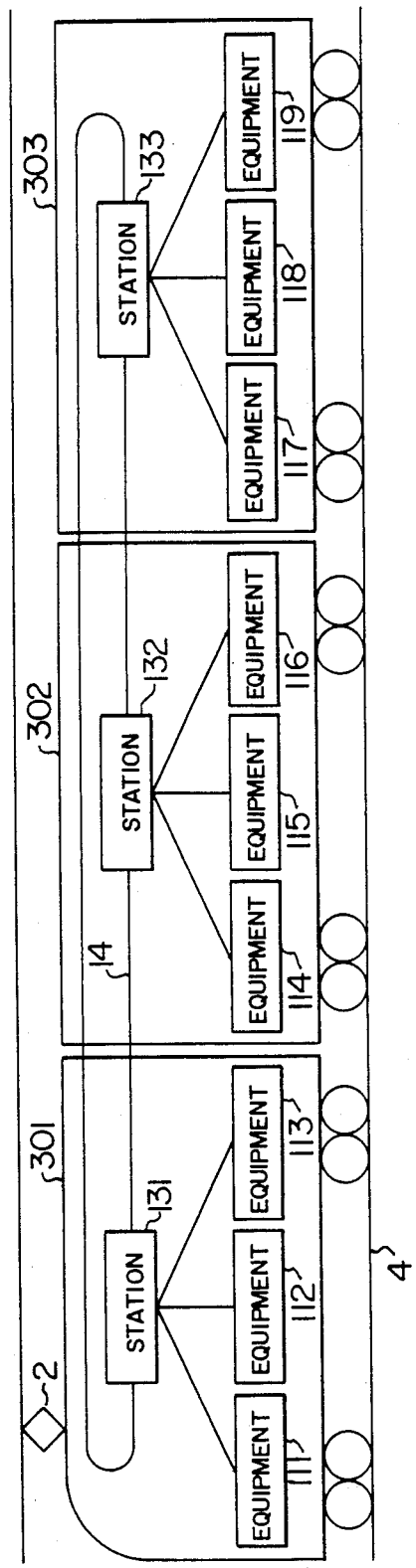
FIG. 1 shows schematically a general arrangement of an intra-train data transmission system to which the invention is applied.

Referring to FIG. 1, there is shown a train 3 running on a rail 4 as driven by an electric motor (not shown) which is supplied with electric energy from an overhead line 1 by way of a pantograph 2. The train 3 is composed of a plurality of vehicles or cars 301 to 303. Each of the cars are equipped with a transmitter/receiver station 131, 132 or 133 in addition to various onboard equipments 111 to 119. The transmitter/receiver stations 131 to 133 are coupled to one another through a looped transmission path 14 which serves for transferring various information (inclusive of commands, control signals and the like) between or among given ones of the transmitter/receiver stations on a time division multiplex basis, as is known in the art.

Figure 2:
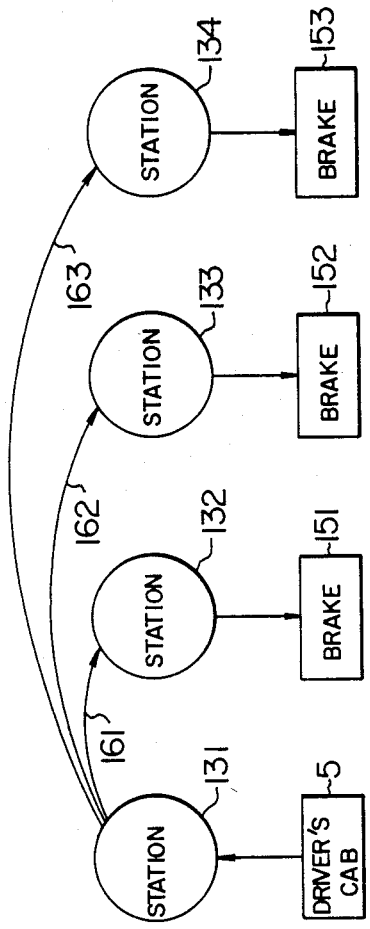
FIG. 2 is a view for illustrating flow of information in the intra-train data transmission system.

The present invention concerns an arrangement for utilizing a particular time slot of transmitted data for transmission of data such as commands and status indicating signals. FIG. 2 illustrates schematically the manner of application of the brake control command signal in a train. In the figure, a reference numeral 5 denotes a driver's console or cab provided on a particular one of the cars, 151 to 153 denote brake systems provided on each of the cars, and 161 to 163 denote brake control command signals. Since the brake control command signal 161 to 163, which originate in a transmitter/receiver station installed in the driver's cab, are transmitted to a plurality of braking systems 151 to 153, respectively, the command issuing transmitter/receiver station is considered to be constituted by one (e.g. 131) of the stations while other stations 132 to 134 constitute the command receiving transmitter/receiver station, when the information signal is to be transmitted by way of the onboard data transmission network.

Figure 3:
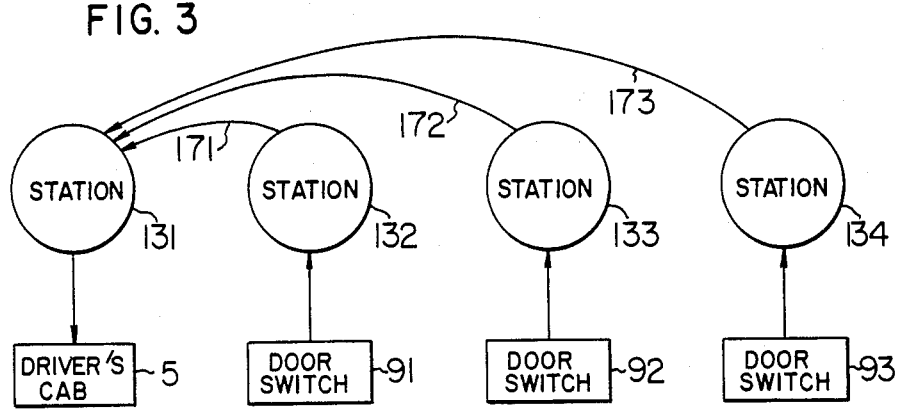
FIG. 3 is a view illustrating another example of data flow.

On the other hand, in case the doors of the individual cars are to be controlled, the flow of the corresponding information signal originates in individual door switches 91 to 93 of the cars and terminates at the transmitter/receiver station 131 of the driver's cab or console, as is illustrated in FIG. 3, in which figure the door status signals are designated by 171, 172 and 173. Since the door status signals 171 to 173 constitute a power running permission signal transmitted to the transmitter/receiver station 131 installed in the driver's cab 5, a number of the transmitter/receiver stations 132 to 134 are then considered to serve as the command issuing stations while the single transmitter/receiver station 131 serves as the command receiving station in opposition to the signal flow in the case of the brake control mentioned above. It goes without saying that fail-safeness is required for these signal transmissions. Accordingly, the onboard data transmission network must be able to assure the fail-safe transmission independent of the number of the command issuing transmitter/receiver stations and the command receiving transmitter/receiver stations without fixing any transmitter/receiver stations as the command issuing station(s) or the command receiving station(s) while enjoying the same flexibility as that available in the usual time division multiplex transmission.

In this connection, it should be pointed out that data transmission of this kind which includes simultaneous transmission of a command signal from a single point to a plurality of points on one hand and on the other hand simultaneous transmission of a command from a plurality of origins to a single destination where decision and/or control is made on the basis of the received information is not restricted to the application in a train but is adopted in other various systems such as ships, air-planes, plants and others.

Figure 4:
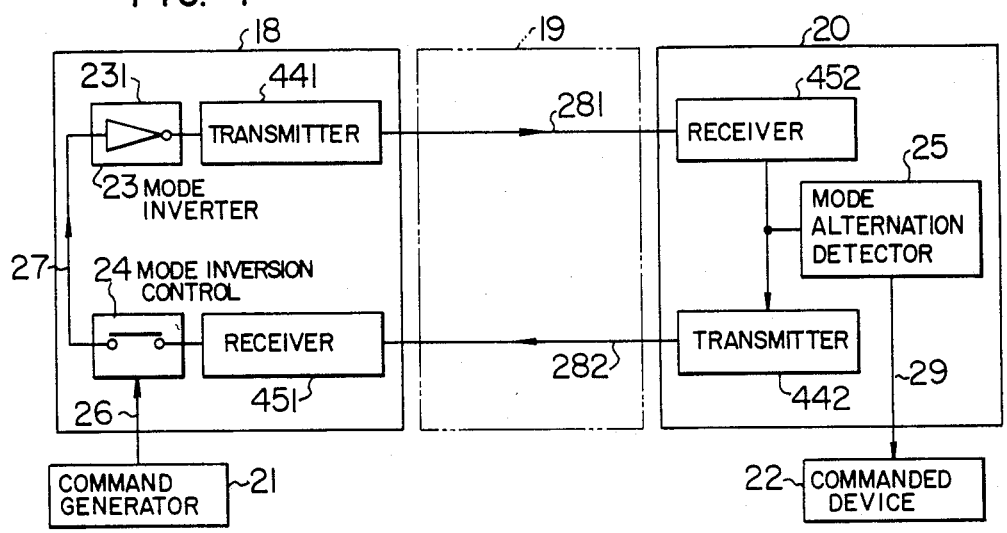

FIG. 4 shows a block diagram of a data transmission system according to a basic embodiment of the present invention which is arranged to make use of a particular time slot on the following assumptions or conditions:

(1) Data transfer is carried out between only two stations.
(2) Transfer of a number of data is permitted between the two stations for the information which in general requires no fail-safeness.
(3) Information requiring fail-safeness is restricted to only information that is transmitted from the transmitter/receiver station 18 to the station 20.

The transmitter/receiver stations 18 and 20 are coupled with each other through a data transmission path 19. The transmitter/receiver station 18 includes a transmitter unit 441 and a receiver unit 451 while the station 20 is equipped with a transmitter unit 442 and a receiver unit 452. Accordingly, a lot of information can be transferred between both the stations 18 and 20 through the known time division multiplex transmission (details of which will be described hereinafter).

Now, considering the particular time slot for the transmission of data which allows the fail-safe transmission, the command issuing station 18 is equipped with a command generating device 21. A command signal produced by the command generator 21 is supplied to a mode inversion control unit 24 which may be constituted by an electric switch or contact means in the case of the illustrated embodiment of the invention. A reference numeral 23 denotes a mode inverter which may be constituted by a logical code inverter 231.

On the other hand, in the command receiving station, the data received by the receiver unit 452 are transmitted intact through the transmitter unit 442, so far as the data in concern belongs to the particular time slot. The received data is supplied to a mode alternation detecting unit 25 to detect the presence or absence of the alternation of the predetermined data modes, wherein received information signal 29 corresponding to the result of the detection is supplied to a command receiving unit 22.

In this connection, the phrase "alternation of the data modes" is used to mean that the mode of information which can be discriminatively identified by the presence or absence of a signal, polarity, magnitude, identifying code or the like varies repetitively. As a typical example of the alternation of data modes, there may be mentioned logical signals "1" and "0" which appear alternately, such as 1, 0, 1, 0, . . . . However, any other pattern of alternation may be used so long as the pattern is distinctive, such as 1, 00, 1, 001 . . . .

Figure 5:
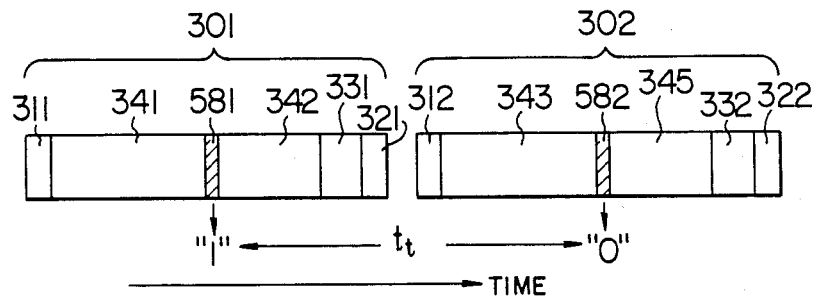
FIG. 5 is a view illustrating an exemplary structure of data transmitted on the time division multiplex basis.

FIG. 5 illustrates, by way of example, the format of data 28 transmitted along the data transmission path 19.

Referring to FIG. 5, reference numerals 301 and 302 designate data frames of data groups sent onto the transmission path 19, numerals 311 and 312 designate leading flags, 321 and 322 designate trailing flags, 331 and 332 designate frame check codes, and 341 to 345 designate data groups exclusive of those of the particular time slots 581, 582 and so forth, i.e. the data groups except for those outputted from the mode inverter 23, which data can be mutually transferred between the transmitter/receiver stations 18 and 20 without any restriction.

In this way, the output data of the mode inverter unit 23 may be present on the transmission path 19 mixedly with other data sent out by the same transmitter/receiver station, imposing no restriction on the serviceability of the transmission network.

The data mode of the particular time slots 581, 582 and so forth (generally represented by 58), as shown in FIG. 5, is alternated only when the command issuing station 18 sends out a dangerous command. More specifically, when the command generator 21 produces a dangerous command (e.g. brake releasing command), the mode inversion control unit 24 serves merely as a part of the transmission path. (When the control unit 24 is constituted by a switch or contact 241, the latter may simply be turned on.) Accordingly, the inverter 23 of the mode inverting unit 23 produces as the output thereof a logic "0" signal at the time slot 58 in response to the input signal of logic "1" and vice versa. In this way, the loop transmission system constitutes an oscillating system of a period corresponding to a circulation of the time slot 58. In other words, the data mode is alternated from "1" to "0", "0" to "1" and so on at every time slot 581, 582 and so forth.

In the command receiving station, the data of the mode received by the receiver unit 452 is sent out intact through the transmitter unit 442, while the presence or absence of the alternation of data modes at the time slot 58 is detected by the mode alternation detecting unit 25. Since it is assumed that the alternation of the mode is present, the command for operation possibly involving danger is supplied to the command receiving apparatus 22 for releasing the brake or holding the brake in the released or opened position, by way of example.

Next, when the command generating device 21 produces an information relating to a safe operation (e.g. braking command), the mode inversion control unit 24 breaks the transmission path in association with the time slot 58 (by turning off the switch 241). Accordingly, alternation of the mode which can take place only when a circulation of the loop transmission path is made is stopped.

In the command receiving station 20, the mode alternation detecting unit 25 confirms instantaneously or after a given number of the time slots that the mode alternation is absent, and subsequently the command for the safety operation is supplied to the commanded apparatus 22 which activates the operation for safety, e.g. the braking operation.

Figure 6:
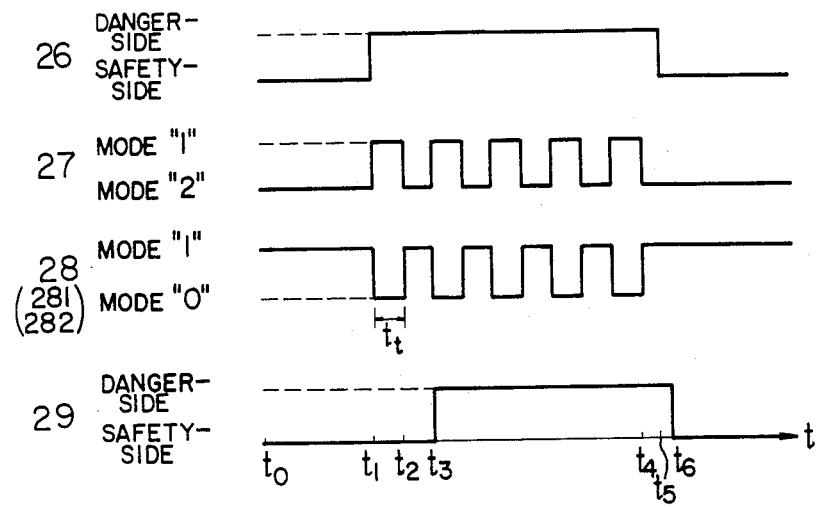
FIG. 6 shows time charts of signals and data for illustrating the particular time slot.

Referring to FIG. 6 which shows signal waveform diagrams for illustrating the operation of the embodiment shown in FIG. 4, a symbol $t_t$ represents a period taken for the output signal 281 of the mode inverter 23 to make a round between the transmitter/receiver stations 18 and 20. In this figure, consideration is paid only to the time slots 58 (581, 582 . . . ).

At first, for a period $t_0$ to $t_1$ during which the output signal 26 of the commanding device 21 indicates a safe operation (e.g. braking command), the switch or contact 241 of the mode inversion control unit 24 is opened to cut off a portion of the looped transmission path. Under the circumstance, the data signal 27 is logic "0" independent of the mode of the data 282 on the data transmission path 19.

When the signal 26 is changed over to the command for a dangerous operation (e.g. brake releasing command) from the safe operation, the mode inversion control unit 24 allows the data signal 282 of the mode "1" to pass therethrough, whereby the output signal 27 assumes the mode of logic "1" which is then inverted by the mode inverter 23 to the mode of logic "0" to be sent onto the transmission path 19 through the transmitter unit 441.

In the command receiving station 20, the information 281 is extracted from the group of the received data and supplied to the mode alternation detecting unit 25 to be fed back intact to the commanding station 18.

The information signal 282 is in the mode or state of logic "0" and passes through the mode inversion controlling unit 24 having the contact 241 closed, resulting in the data signal 27 of the mode "0". In this way, the mode inversion from "0" to "1" is again performed by the mode inverter 23, whereby the data signal 281 on the transmission path 19 assumes the state or mode of logic "1".

So long as the information 26 designates a dangerous command, the operation described above is repeated. As a consequence, the input signal 28 to the mode alternation detecting unit 25 is an alternating signal, as shown in FIG. 6.

Although the period of alternation undergoes influence of the time taken by both the stations 18 and 20 for the processing for transmission, it is possible to maintain the period at a substantially constant value by managing or controlling the timing for transmission in the transmitter/receiver station.

The mode alternation detecting unit 25 produces an output signal representing a dangerous command only provided that the input signal 28 is in the predetermined mode and that the period $t_r$ lies within a predetermined range, which is determined according to the pattern of alternation.

With the arrangement described above, failure in transmission over the transmission path and/or fault occurring in the transmitter/receiver station 18 or 20 stops the alternation of the mode, necessarily resulting in an output signal 29 representing a safe command from the mode alternation detecting unit 25. In this way, fail-safeness can be assured for any failure or fault in the transmission system extending from the command generating device 21 to the commanded apparatus 22.

Figure 7:
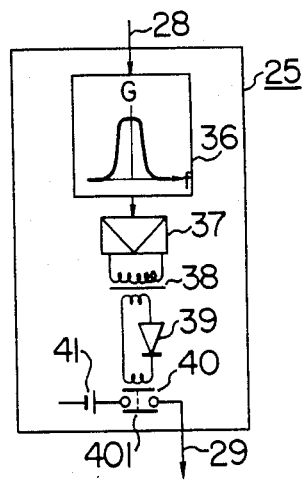
FIG. 7 is a schematic diagram showing an arrangement for detecting alternation of data mode.

By the way, the mode alternation detecting unit 25 serves to convert the alternating signal to a signal of a predetermined level. Accordingly, when a fault occurs in this unit 25 which gives rise to generation of an output signal representing a dangerous command, the fail-safeness can no longer be assured. FIG. 7 shows an arrangement to prevent the fail-safe feature from being invalidated as mentioned above.

Referring to FIG. 7, a reference numeral 36 denotes a bandpass filter, 37 denotes an amplifier, 38 denotes a transformer, 39 denotes a rectifier, 40 denotes an electromagnetic relay, and 41 denotes a power supply source.

The bandpass filter 36 serves to check whether the period of alternation of the input signal 28 thereto is within a predetermined range. The output signal of the bandpass filter 36 is supplied to the amplifier 37 for AC power amplification. The DC component contained in the output signal of the amplifier 37 is suppressed by the transformer 38, the secondary voltage thereof being converted to a DC voltage by the rectifier 39 for driving the electromagnetic relay 40. Only when a relay contact 401 is closed, the command signal 29 from the circuit shown in FIG. 7 is allowed to be in the dangerous mode. It will be appreciated that this circuit can assure the fail-safe feature because the contact 401 is opened substantially for all the faults.

The fail-safe feature in the data transmission according to the present invention can be retained even when the number of the transmitter/receiver station is increased.

Figure 8:
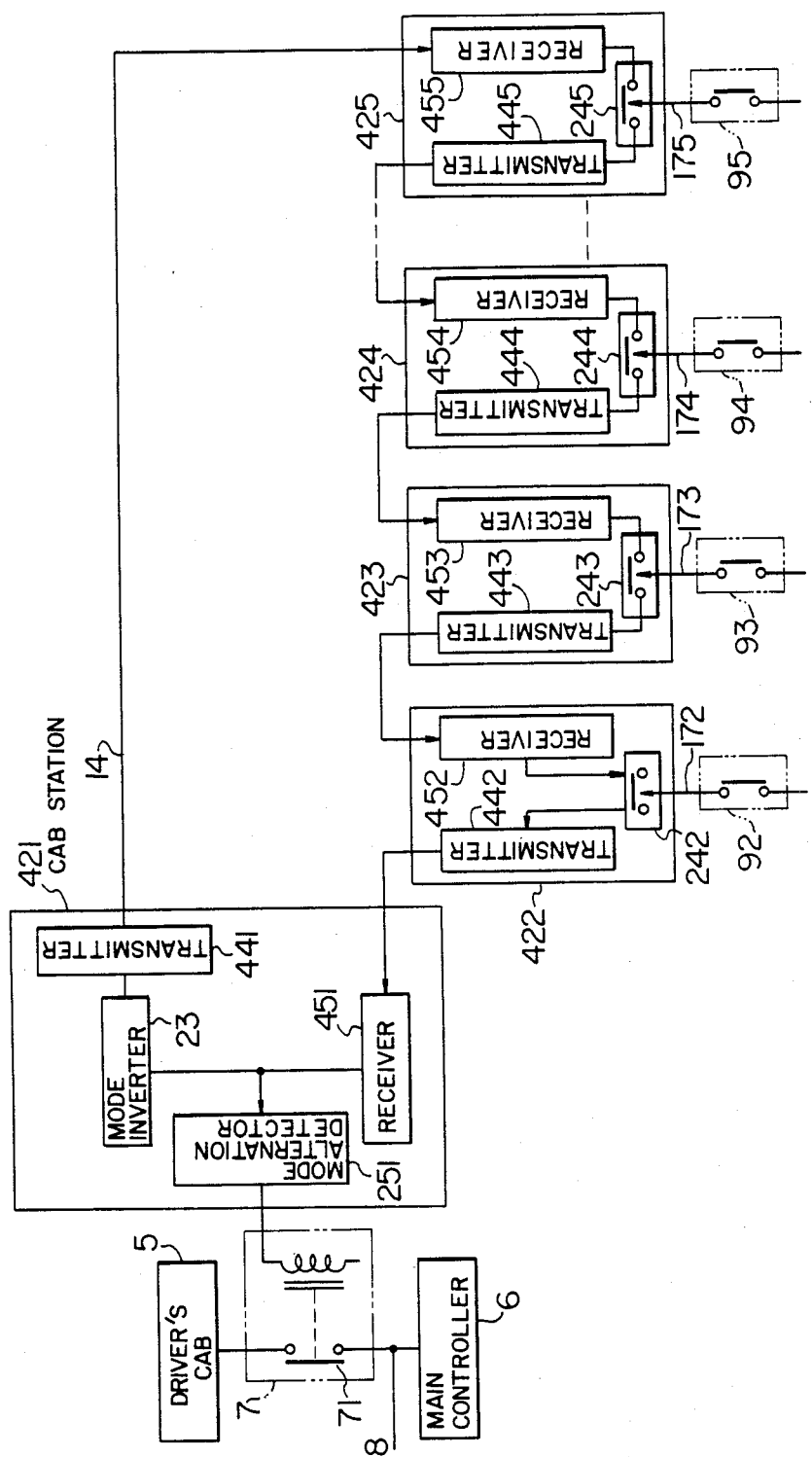
FIG. 8 is a view showing a general arrangement of a data transmission system according to another embodiment of the invention applied to transmission of signals representative of opened and closed states of passenger's doors in a train by making use of a particular time slot.

FIG. 8 shows a second exemplary embodiment of the present invention applied to the power running control of the train in dependence on opening/closing of the passenger's doors.

In FIG. 8, a reference numeral 421 denotes a transmitter/receiver station installed in the driver's cab of the train, 422 to 425 denote transmitter/receiver stations installed in the individual cars, respectively, 441 to 445 denote transmitter units of the individual stations, respectively, and 451 to 455 denote receiver units thereof, respectively.

As described hereinbefore, the passenger's door status signals 172 to 175 are made use of as the power running permission command supplied to the driver's cab or console 5. Arrangement has to be made such that, only when all the passenger's door status signals 172 to 175 indicate that the doors are closed, will the contact 71 of the electromagnetic relay 7 be closed. To this end, the transmitter/receiver stations 422 to 425 installed at the individual cars are equipped with the mode inversion control units 242 to 245, respectively, which are adapted to be so controlled by door switches 92 to 95 that all the mode inversion control units 242 to 245 and the mode inversion unit 23 installed at the station 421 for the driver's cab are connected in a loop-like configuration along the flow of data to be transmitted. On the condition, alternation of the mode similar to the one described hereinbefore by referring to FIG. 7 takes place, resulting in that the output signal of the mode alternation detecting unit 251 drives or energizes the electromagnetic relay 7 to thereby allow the power running command signal 8 to be transmitted to a main controller 6 from the driver's cab 5.

As in the case of the first embodiment of the present invention, when breakage occurs in the onboard transmission path 14 and/or when power shutdown or other fault occurs in any one of the transmitter/receiver stations, the alternation of the mode is stopped without fail, to prevent the power running command 8 from being transmitted to the main controller 6 to assure the fail-safe feature. Also in the case of the embodiment shown in FIG. 8, the particular one of the time slots for data transmission are made use of for accomplishing the intended object in the manner similar to the preceding embodiment. Needless to say, the other time slots can be utilized for transmission of plural data among the transmitter/receiver stations 42 and 431 to 434.

In the intra-train data transmission system according to the instant embodiments of the invention, those signals for which the fail-safeness is required can be transmitted through the transmission path 14 together with other various data, to an advantage. Additionally, the fail-safe feature can be significantly improved when compared with the hitherto known system in which a specific transmission line is provided exclusively for preventing the power running operation in response to the open-door status signal, to another advantage. More specifically, in the hitherto known system where the wiring is made among the vehicles or cars such that a closed circuit is constituted by the power supply source, the door switches 92 to 95 and the electromagnetic relay 7, the power running command will be issued independent of the status of the passenger's doors if the insulation on the conductors wired among the plural door switches is damaged or impregnated with water to thereby produce a short-circuit to the car body. Thus, there arises the danger of the fail-safe feature being spoiled. In reality, this kind of fault sometimes occurs.

In contrast, a data transmission system according to the invention as described above can assure not only the fail-safeness of the data transmission path but also provide the system for controlling the doors with a much increased safety and reliability as compared with the hitherto known system used only to this end.

In both apparatus shown in FIG. 4 and 8, the mode inverter 23 may be provided in either the command issuing station or the command receiving station or alternatively incorporated in the data transmission path.

Next, a third embodiment of the present invention as applied to the brake control system of a train will be described by referring to FIG. 9.

Figure 9:
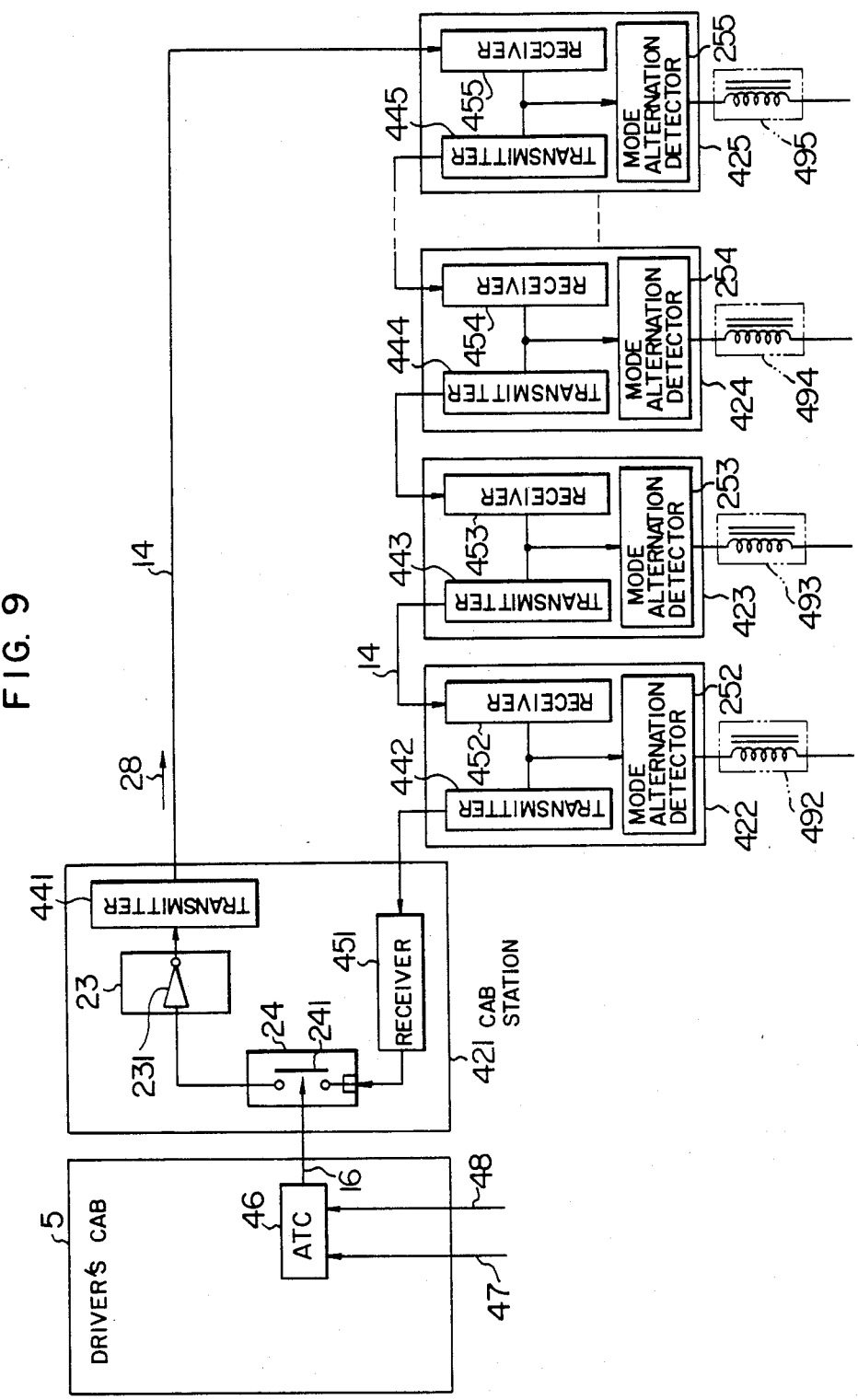
FIG. 9 is a view showing schematically an arrangement of the data transmission system according to another embodiment of the invention applied to transmission of brake command signals issued by an automatic train control (ATC) of a train by making use of a particular time slot.

In FIG. 9, a reference numeral 46 denotes an automatic train control (ATC) system, 47 designates a speed limit signal, 48 designates a speed signal, and 492 to 495 denote electromagnetic valves for brakes.

In the case of the embodiment shown in FIG. 9, arrangement is made such that the brake control command signal 16 is generated by the ATC system 46, wherein interruption of the mode alternation is controlled by the mode inversion control unit 24 incorporated in the transmitter/receiver station installed in the driver's cab. The electromagnetic valves 492 to 495 of the brake mechanisms are controlled by the mode alternation detecting units 252 to 255 of the transmitter/receiver stations 422 to 425 installed in the individual cars, respectively.

By performing the control in such a manner in which the alternation of the mode takes place so long as the value of the speed signal 48 is smaller than the speed limit signal 47, the fail-safe feature that the brakes are actuated upon occurrence of the faults in the components in concern can be assured, as in the case of the second embodiment.

It will be understood that according to the teaching of the invention inherent in the second and third embodiments described above, the fail-safe transmission of information can be accomplished independent of the number of the command issuing transmitter/receiver station(s) and the command receiving station(s).

Figure 10:
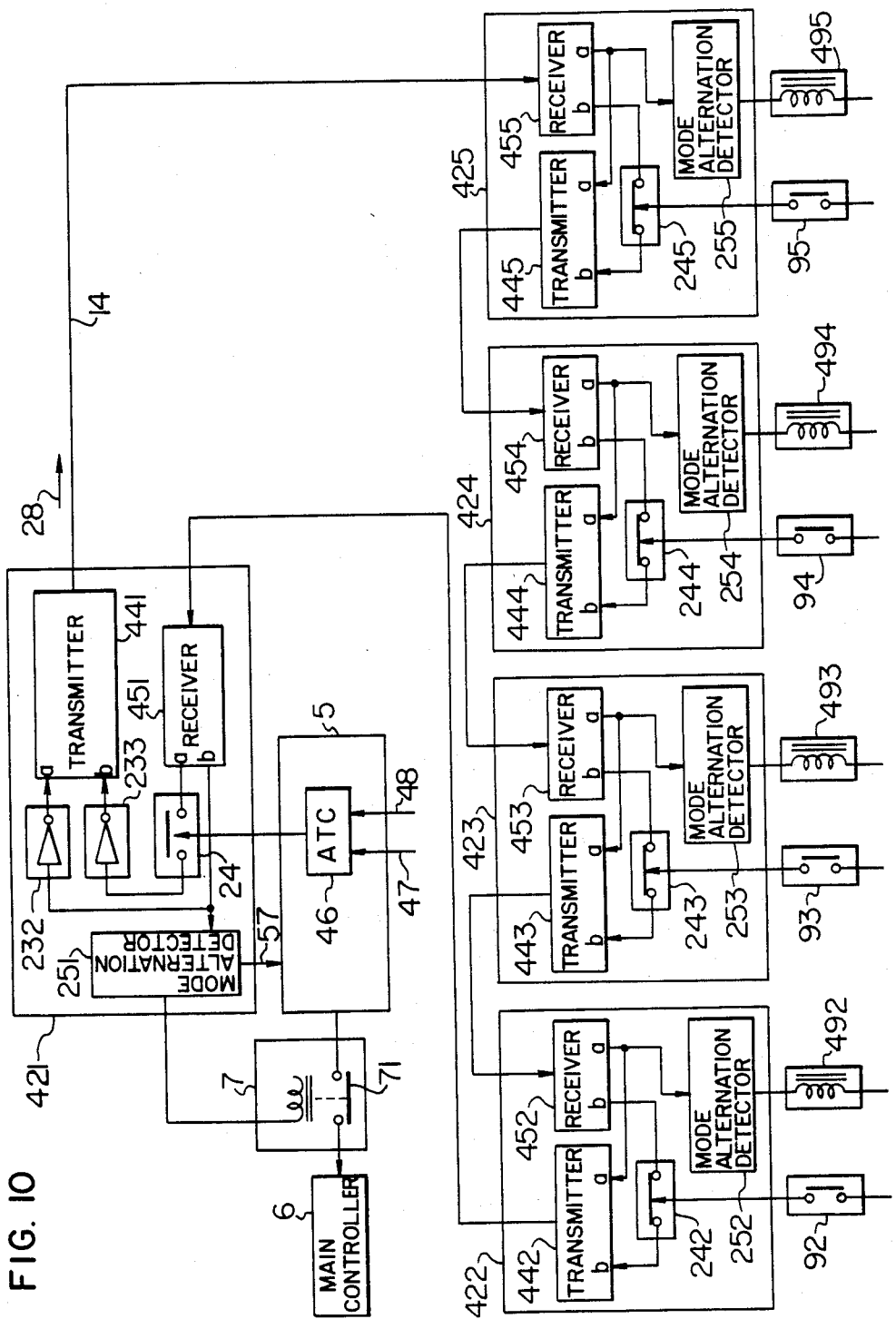
FIG. 10 is a view showing an arrangement corresponding to a combination of the data transmission systems shown in FIGS. 8 and 9.

FIG. 10 shows in a block diagram another embodiment of the invention which substantially corresponds to a combination of the apparatus shown in FIGS. 8 and 9. It is desirable that the individual transmitter/receiver stations 421 to 425 should be provided with terminal devices in succession to the mode inversion control units 24, 242 to 245 and the mode alternation detecting units 251 to 255. With this arrangement, substantially all the intra-train data can be transferred by way of the transmission path 14.

In case there exist a plurality of different kinds of information for transmission which require fail-safeness, a corresponding number of such particular time slots are utilized for conveying information in the form of presence or absence of the predetermined alternation of the data modes. Accordingly, each of the transmitter units 441 to 445 and each of the receiver units 451 to 455 are provided with two terminals a and b for reading out the contents of the two particular time slots in a register provided to each unit for storing, in a form of parallel data, the serial data 28 transmitted along the transmission path 14. In correspondence with these two particular time slots, two mode inverters 232 and 233 are incorporated in the transmission loop. By closing the contacts or switches of the mode inversion control unit 24 or 242 to 245, the data mode at the respective particular time slots is caused to alternate. On the other hand, when the contacts are opened, the alternation of the data modes disappears.

Operation of the system shown in FIG. 10 can be easily understood from the description provided in conjunction with FIGS. 8 and 9. In FIG. 10, a reference numeral 57 designates a signal indicative of confirmation of operation.

In the foregoing description, it has been assumed that the invention is applied to the data transmission system of loop-like transmission path configuration. It goes however without saying that the invention can be applied to other types of the tranmission path.

Figure 11:
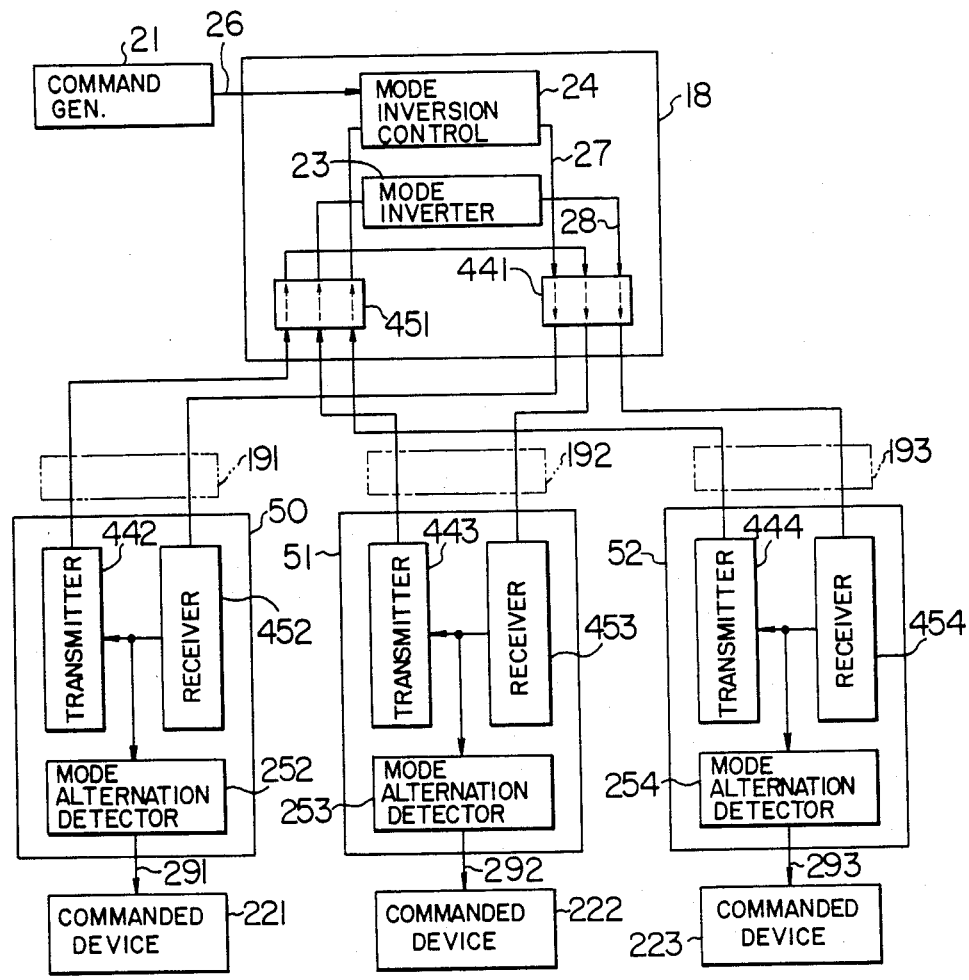
FIGS. 11 and 12 show further embodiments of the invention applied to radial-type looped data transmission paths, respectively.

FIG. 11 shows a further embodiment of the invention. In this figure, reference numerals 50 to 52 denote command receiving transmitter/receiver stations disposed radially around the command issuing station 18. The command issuing transmitter/receiver station 18 is connected to the command receiving stations 50 to 52 separately through bi-directional transmission paths 191 to 193, respectively. The output signal 28 of the mode inverter 23 is supplied to the input of the mode inversion control unit 24 of the commanding station 18 by way of the commanded station 52 and is subsequently transmitted through the commanded stations 50 and 51 to be again fed back to the mode inverter 23. In this way, a loop transmission path is realized. Only when a command 26 indicating potentially dangerous operation is issued by the commanding unit 21 will the repetitional mode alternation makes its appearance on the loop, whereby command signals 291 to 293 indicative of operation possibly involving danger are supplied to the commanded units 221 to 223.

Figure 12:
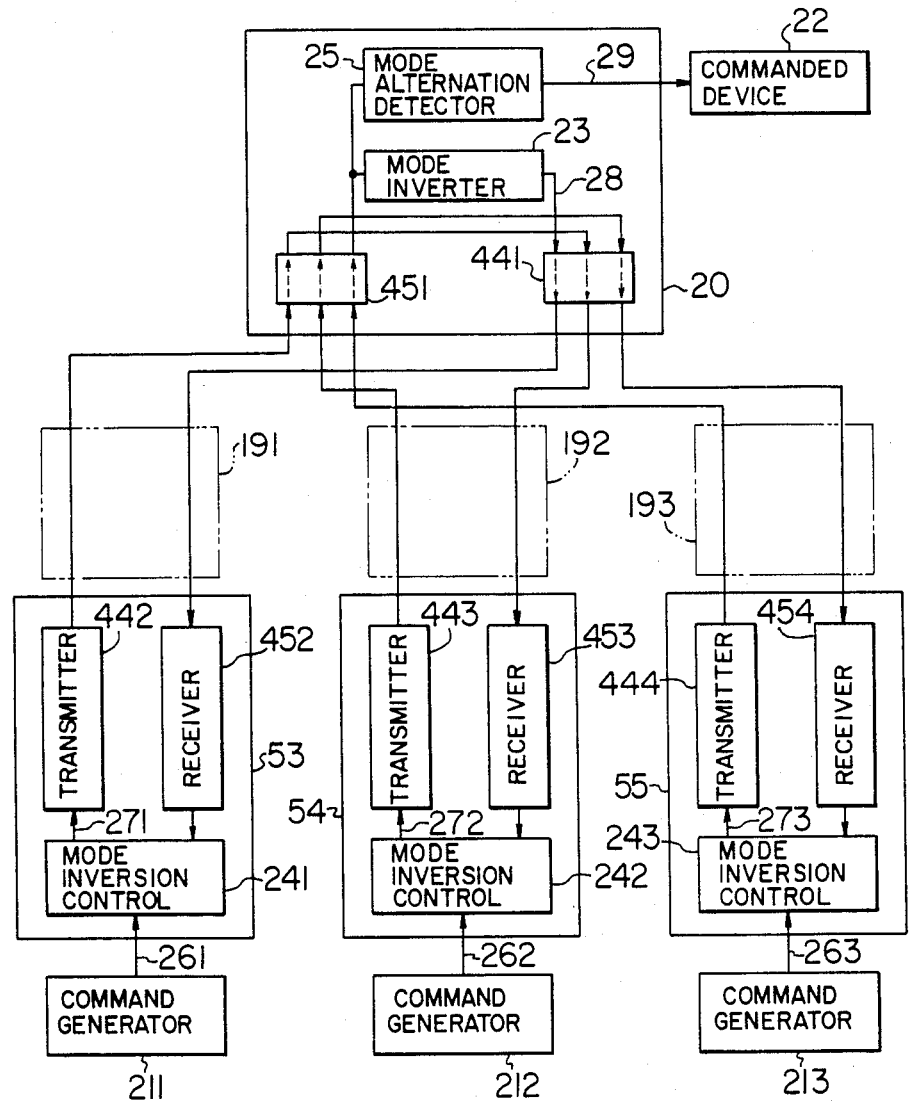

FIG. 12 shows still another embodiment of the invention. There is provided a data transmission network of radial configuration similar to that of the embodiment shown in FIG. 11. However, the arrangement is such that in case there exist a plurality of commanding stations, the fail-safe control is performed only when all the commands 261 to 263 indicate simultaneously an operation accompanied with danger.

In FIG. 12, reference numerals 53 to 55 denote the commanding stations (i.e. command issuing transmitter/receiver stations), respectively. Since the signals representing the modes flow in a loop as in the case of the embodiment shown in FIG. 11, there are produced no commands deprived of fail-safeness in response to faults occurring at any locations of the data transmission network.

In the foregoing description of the embodiments, it has been assumed that the invention has been applied to the data transmission networks of the loop configuration and the radial configuration, respectively. However, it should be appreciated that the invention can equally be applied to other type data transmission networks such as, for example, mesh-type, ladder-type, and bus-type networks. By resorting to the arrangment in which the mode signal flow takes a looped path, the fail-safe feature can be realized in a completely satisfactory manner.

Figure 13:
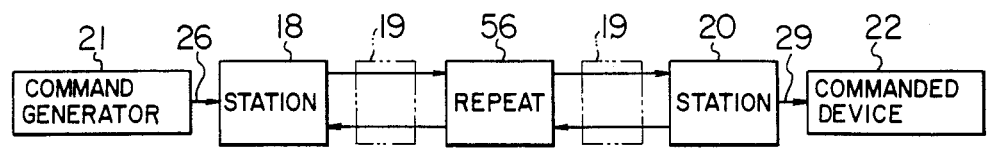
FIG. 13 shows a general arrangement of a data transmission system in which repeat stations are installed according to still another embodiment of the invention.

In the case of the embodiments described so far, the commanding station is directly connected to the commanded stations by way of the transmission path. However, it should be noted that a repeat station which makes no use of the signal which the invention concerns may be interposed between the commanding and the commanded stations, as is shown in FIG. 13, where the repeat station is denoted by a numeral 56.

The repeat station 56 may be so configured as to relay the mode signal in a frame structure such as illustated in FIG. 5 so that the repeat station may freely have access to the other groups of data 34.

As will be apparent, there is imposed no limitation on the number of the repeat station. The data transmission network including such repeat stations is not restricted to the one-to-one transmission path but may be implemented in a loop, radial- or mesh-type, ladder-type, bus-type or other configurations.

Next, description will be made on a method of supervising or monitoring the operation of the data transmission system according to the present invention. So far as the embodiments of the invention described above are concerned, it can be ascertained whether the command issued by the command generating device is transmitted to the detailed commanded apparatus without fail (i.e. with fail-safeness).

Figure 14:
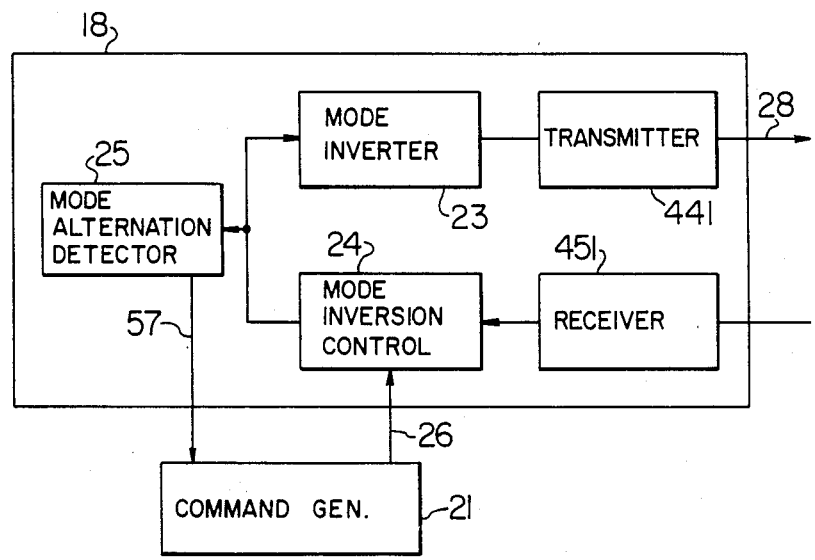
FIG. 14 shows an arrangement of a command issuing station provided with means for producing operation confirming indication according to a further embodiment of the invention.

FIG. 14 shows a seventh embodiment of the invention in which the above problem is disposed of. More specifically, the instant embodiment concerns an improvement of the commanding transmitter/receiver station 18 shown in FIG. 6.

In FIG. 14, a numeral 57 designates an operation indicating signal.

When the alternation of the data mode (status) takes place on the data transmission network in response to the command signal 26 indicative of an operation accompanied with danger, this is detected by the mode alternation detecting unit 25 installed in the commmanding station, whereby the operation indicating signal 57 is supplied to the command generating device 21.

Since indication of the transmission of the command exerts no influence on the mode alternation itself, the indication of the commanded operation may be made in each of the commanding stations, if any.

In the case of the embodiments described so far, the mode signal follows the looped path regardless of the type of the transmission path. In connection with these embodiments, it is found that when the alternation ceases due to some cause or fault, difficulty is encountered in identifying rapidly the location where the fault has occurred for thereby eliminating the fault.

Figure 15:
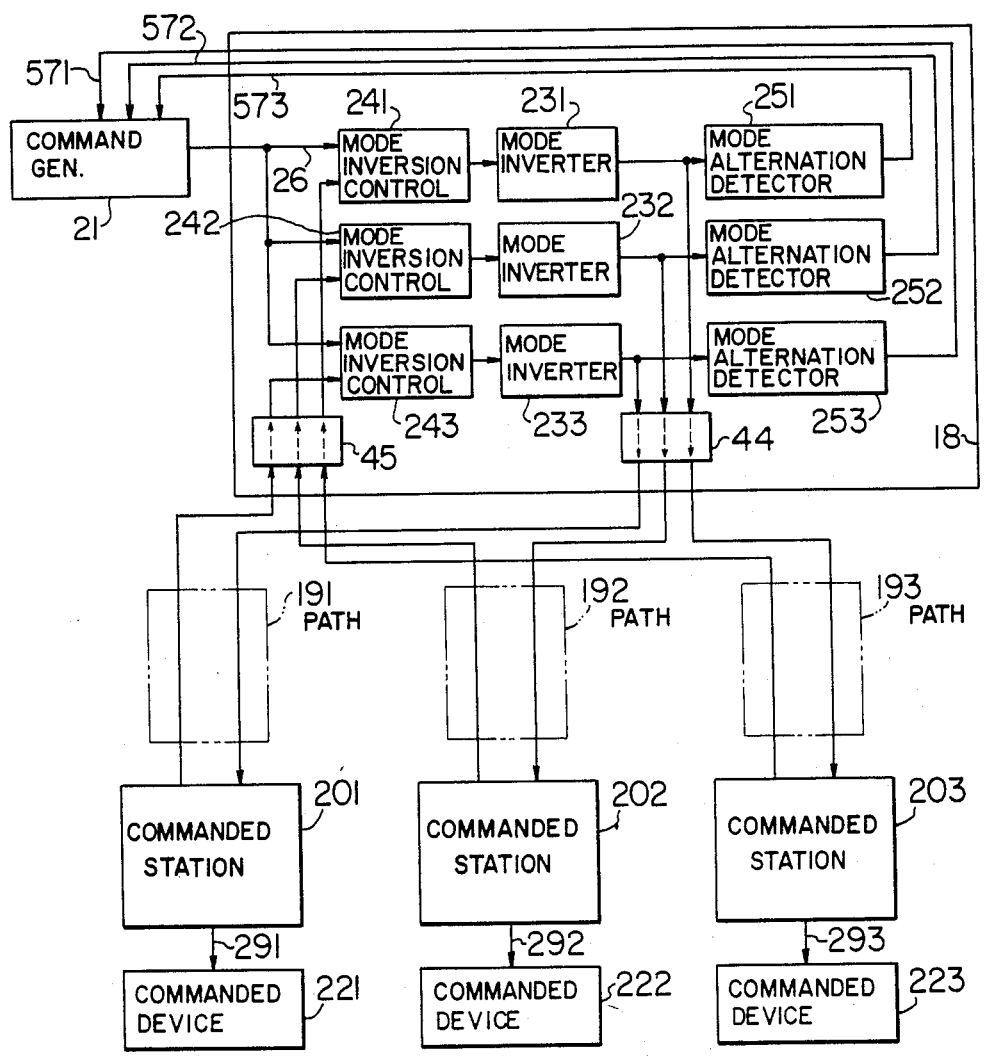
FIGS. 15 and 16 show, respectively, further embodiments of the invention adapted for identifying locations of data transmission system where fault occurs.

FIG. 15 shows a further embodiment of the invention intended for disposing of the above problem.

Referring to FIG. 15, the commanding station 18 is provided with loops for mode alternation separately for the commanded stations 201 to 203, respectively, wherein the individual mode inversion control units 241 to 243 are controlled by a common command signal 26 to thereby allow the respective mode alternation detecting units 25 to monitor whether the associated modes are alternating, respectively. With this arrangement, the mode ceases alternation only on the route where a fault has occurred. Accordingly, the route suffering the fault can be readily identified.

Determination of the route suffering the fault on the station basis is not restricted to the data transmission network of the radial configuration shown in FIG. 15.

Figure 16:
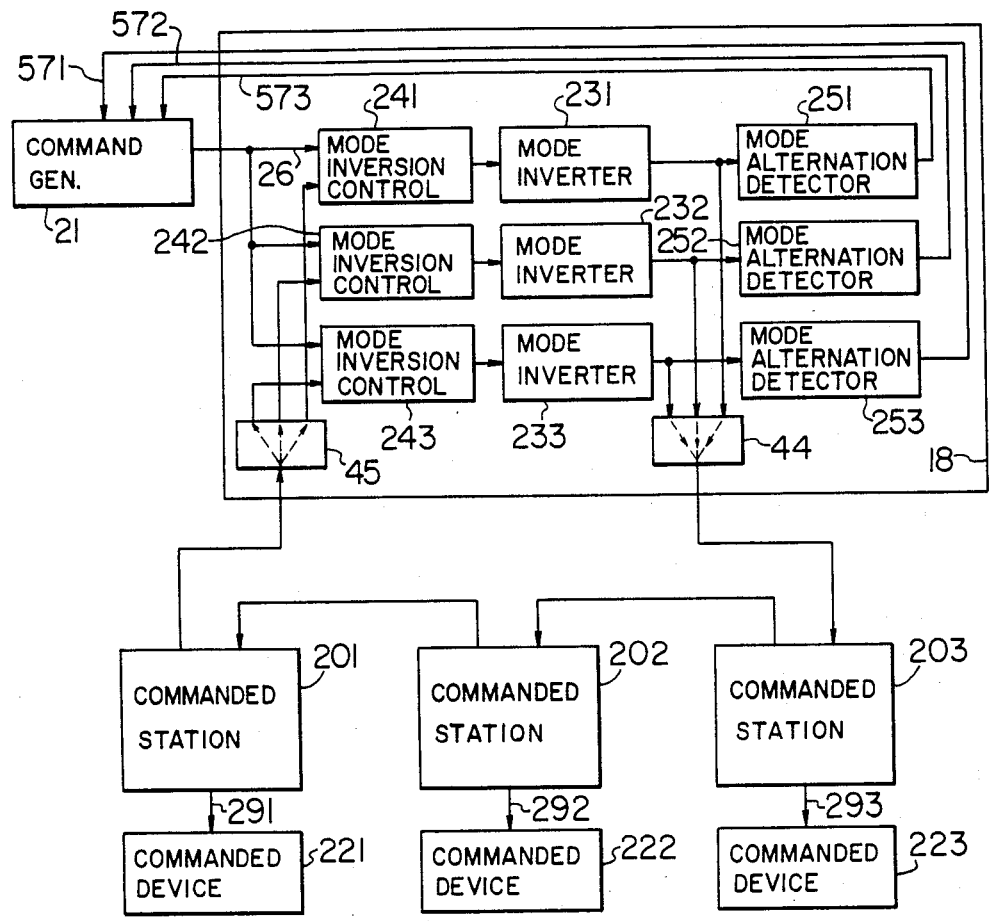

Another embodiment of the invention applied to the loop-type data transmission network is shown in FIG. 16.

In the case of the embodiment shown in FIG. 16, mode information unique to the commanded stations 201 to 203, respectively, are made use of, wherein the transmission procedure is so established that each of the commanded stations serves as the repeat station for the mode information allotted to the other stations. With this arrangement, alternation of the data modes is generated separately for each of the commanded stations, to thereby much facilitate identification of the location of fault on a station basis when compared with the embodiment shown in FIG. 9.

In the loop-type data transmission network described above, the supervision effected by the group of the mode alternation detecting units 251 to 253 may also be realized in the commanded stations 201 to 203 in addition to or in place of the commanding station 18 as in the case of the embodiment shown in FIG. 16.

The foregoing description has been made on the assumption that the data transmission path constitutes ultimately a closed loop for accomplishing the alternation of modes. However, the invention is never restricted to this type data transmission network. The device for realizing the mode alternation may be diposed in a particular station and/or on the transmission path.

Further, it goes without saying that the function for determining the generation and stoppage of mode alternation or detecting the presence and disappearance of the predetermined mode alternation is susceptible to numerous versions.

It will now be appreciated that data transmission through a time division multiplex transmission path can be carried out with the data for fail-safeness being added according to the teachings of the invention.

What is claimed is:

1. A data transmission system including a plurality of stations and a data transmission path interconnecting said stations in a looped configuration of transferring data among said stations on a time division multiplex basis,
   wherein transmission of particular information is realized in terms of a predetermined alternation of data modes generated at a particular time slot for each circulation of the data along said looped transmission path and disappearance of said predetermined alternation, and wherein said particular information is binary information indicative of safe operation and dangerous operation, respectively, the information indicative of dangerous operation being represented by said predetermined alternation of said data modes, while the information indicative of safe operation is represented by the disappearance of said predetermined alternation of said data mode.

2. An intra-train data transmission system for a train, including a plurality of stations installed, respectively, on cars which compose said train; and a data transmission path interconnecting said stations with one another for transferring data among said stations on a time division multiplex basis;
   wherein transmission of particular information is realized in terms of a predetermined alternation of data modes alternating at a frequency at which a particular time slot makes appearance in the transmissio of data and disappearance of said predetermined alternation, said particular information containing signals being indicative of the opening and closing of passenger doors of each of said cars; and wherein the door closing indication signal is represented by said predetermined alternation of the data mode, while the door opening indication signal is represented by disappearance of said predetermined alternation of the data mode.

3. An intra-train data transmission system for a train, including a plurality of stations installed, respectively, on cars which compose said train; and a data transmission path interconnecting said stations with one another for transferring data among said stations on a time division multiplex basis;

wherein transmission of particular information is realized in terms of a predetermined alternation of data modes alternating at a frequency at which a particular time slot makes appearance in the transmission of data and disappearance of said predetermined alternation, said particular information containing commands indicating actuation and release of brakes and information concerning opening and closing of passenger's doors for each of said cars; and wherein the brake releasing commmand is represented by a predetermined alternation of the data modes at a first particular time slot for data transmission, while the brake actuating command is represented by disappearance of said predetermined alternation of the data mode at said first particular time slot;

said door closing information being represented by a predetermined alternation of the data mode at a second particular time slot for data transmission while said door opening information is represented by disappearance of said predetermined alternation of the data mode at said second particular time slot.

4. A data transmission system for a train, including a plurality of stations installed, respectively on cars which compose said train; and a data transmission path interconnecting said stations with one another in a looped configuration for transferring data among said stations on a time division multiplex basis;

wherein particular one of the cars composing said train includes:

an automatic train control apparatus having inputs supplied with a speed limit signal and a speed signal representative of the speed of said train for issuing a braking command signal when said speed signal exceeds said speed limit signal;

receiver means for receiving the data transmitted through said looped transmission path;

transmitter means coupled to said receiver means for transmitting data to said looped transmission path;

means for inverting data transmitted through said looped transmission path at a particular time slot of said transmitted data; and means for opening said looped transmission path at said particular time slot in response to said braking command signal, while each of the other cars includes:

receiver means for receiving the transmitted data from said looped transmission path;

transmitter means for transmitting the data received by said receiver means at said particular time slot as they are;

detecting means for detecting presence or absence of predetermined alternation of data at said particular time slot; and means for applying braking to each of said cars in response to detection of disappearance of said alternation by said detecting means (FIG. 9).

5. A data transmission system for a train, including a plurality of stations installed, respectively, on cars which compose said train; and a data transmission path interconnecting said stations with one another in a looped configuration for transferring data among said stations on a time division multiplex basis;

wherein particular one of said plural cars includes:

a driver's cab for producing a command for power running operation of said train;

control means for activating power plant and transmission gear of said train in response to said power running commmand;

receiver means for receiving data transmitted throughs said looped transmission path;

transmitter means coupled to said receiver means for sending the data onto said looped transmission path;

means for inverting the data transmitted through said looped transmission path at a particular time slot of the transmitted data;

detecting means for detecting presence or absence of predetermined alternation of data in the received data at said particular time slot; and means for invalidating said power running command in response to detection of disappearance of said alternation by said detecting means, while each of the other cars including:

receiver means for receiving data transmitted through the looped transmission path;

transmitter means for receiving and sending intact the data received by said receiver means at said particular time slots; and means for opening said looped transmission path at said particular time slot in response to the output of means for detecting opening of doors of each car.

6. A data transmission system for transferring data carried on a data frame among a plurality of stations on a time division multiplex basis, comprising:

data transmission path means providing at least one closed loop path passing through one of the stations, which transmits a command signal relating to a given operation in a predetermined slot of the data frame, and any receiving station destined to receive the command signal, so that the command signal carried in said slot repeatedly circulates through said one station and said receiving station on said one closed loop path;

mode alternating means operatively associated with said one closed loop path and operative, when said command signal is of a dangerous type which possibly involves a dangerous state upon actuation of the related operation according to said command signal, for modifying said command signal to have a waveform in which first and second modes appear, alternatingly, at a frequency of the repeated circulations of said command signal on said closed loop path; and mode detector means provided in each station which is likely to receive said commmand signal carried in said slot for detecting the modes of said received command signal and determining that said received command signal is of said dangerous type only when said first and second modes appear alternatingly in the received command signal at a frequency in a given frequency range.

7. A data transmission system according to claim 6, wherein said first and second modes are represented by two states of a binary signal, respectively.

8. A data transmission system according to claim 6, wherein said first and second modes are represented by binary logic codes "1" and "0", respectively.

9. A data transmission system for transferring data carried on a data frame among a plurality of stations on a time division multiplex basis, comprising:
   a data transmission path connecting said stations in a closed loop configuration for repeatedly circulating the data frame through said stations, a particular slot of the data frame being allotted to a command signal relating to a given operation;
   mode alternating means provided for each of those stations which may transmit the command signal of a dangerous type which possibly involves a dangerous state upon actuation of the related operation according to the command signal and operative, when the associated station transmits the dangerous type command signal, to modulate the command signal to take first and second modes which alternate from one to the other each time said command signal passes said associated station in circulation around the closed loop of said data transmission path; and
   mode detector means provided for each station which is to receive the command signal carried in the particular slot of the data frame for detecting the modes of said received command signal and determining that said command signal is of the dangerous type only when said first and second modes appear in said received command signal alternatingly at a given frequency range.

10. A data transmission system according to claim 9, wherein said first and second modes are represented by binary logic codes "1" and "0", respectively.

11. A data transmission system according to claim 9, wherein each of said stations includes transmitter means having an output connected to said data transmission path for transmitting such data frame into said data transmission path and receiver means having an input connected to said data transmission path for receiving such data frame from said data transmission path, and said mode alternating means includes an inverter circuit and a switching circuit connected in series between an output of said receiving means and an input of said transmitting means of the associated station;
   said switching circuit being closed only when the command signal carried in the particular slot is of the dangerous type, so that the command signal received by said receiving means is inverted by said inverter circuit and then transmitted from said transmitting means each circulation on said data transmission path.

12. A data transmission system according to claim 11, wherein said mode detector means is connected to a circuit connecting an output of the receiving means and an input of the transmitting means of the associated station.

13. A data transmission system according to claim 11, wherein said series connection of said inverter circuit and said switching circuit allows only the signal carried in the particular slot to pass therethrough.

14. A data transmission system according to claim 12, wherein said series connection of said inverter circuit and said switching circuit allows only the signal carried in the particular slot to pass therethrough.

15. A data transmission system used with a train of cars for transferring data carried on a data frame through a data transmission path among a plurality of stations provided in the cars, respectively, on a time division multiplex basis, comprising:
   circuit means provided for each of said stations for circulating, in cooperation with said data transmission path, at least a particular slot of said data frame, to which an information signal relating to a given operation of the train is allotted, through one of the stations from which said information signal is transmitted and any of the stations which is to receive said information signal;
   said circuit means provided at the transmitting station from which said information signal is transmitted including mode alternating means operating, when the information signal is of a first type representing a first state of said given operation, to modify said information signal to take first and second modes which alternate from one to the other each time said particular slot passes said circuit means; and
   mode detecting means provided for each of the stations which are to receive said information signal for detecting the modes of the received information signal and for determining that said received information signal is of the first type when said first and second modes appear alternatingly in said received information signal and that said received information signal is of a second type representing second state of the given operation when said received information signal includes no alternation of said first and second modes.

16. A data transmission system according to claim 15, wherein said first type information signal is a command signal which instructs releasing the braking in each car and said second type information signal is a command signal which instructs actuation of the braking in each car.

17. A data transmission system according to claim 15, wherein said first and second modes of the information signal are represented by two states of a binary signal, respectively, and said first state of the operation is an operation which involves a possibly dangerous state of the train, while said second state of the operation is an operation which involves no dangerous state of the train.

18. A data transmission system used with a train of cars for transferring data carried on a data frame through data transmission path means among a plurality of stations provided for the cars, respectively, on a time division multiplex basis, comprising:
   circuit means provided for each of said stations for providing, in cooperation with said data transmission path means, at least one closed loop path through which at least a particular slot of said data frame, to which an information signal relating to a given operation of the train is allotted, circulates by passing through any of the stations from which such information signal may be transmitted and any of the stations which are to receive the transmitted information signal;

mode alternating means provided for said closed path and operative, when the information signal is of a first type representing a first state of said given operation, to modify said information signal to take first and second modes which alternate from one to the other each time said particular slot circulates on the associated closed path; and mode detector means provided for each of the stations which are to receive the transmitted information signal for detecting the modes of the received information signal and determining that said received information signal is of the first type representing a first state of said given operation when said first and second modes appear alternatingly in said received information signal and that said received information signal is of a second type representing a second state of said given operation when no alternation of said first and second modes appears therein.

19. A data transmission system according to claim 18, wherein said first and second-type information signals are command signals of first and second types for instructing releasing and actuation of brakes, respectively, in each car.

20. A data transmission system according to claim 18, wherein said first state of the given operation is a closed state of passenger doors of each car and said second state of the given operation is an open state of the doors.

21. A data transmission system according to claim 18, wherein the information signal allotted to the particular slot of the data frame indicates a braking operation of each car; the first and second-type information signal are first and second-type command signals, respectively, for instructing releasing and actuation of the brakes of each car, and a second particular slot of the data frame is further allotted to a second information signal relating to the state of passenger doors, and wherein said system further comprises second modulating means provided for said closed loop path and operative, when said second information signal represents a closing state of the doors, to modify said second information signal to take third and fourth modes which alternate from one to the other each time said second lot circulates and associated closed path; and second mode detector means provided for at least one of the stations which is to receive the transmitted second information signal for detecting the modes of said received second information signal and determining that the received second information signal is of the first type when the alternation of the modes appears therein and that the received second information signal is of a second type when no alternation of the modes appears therein.

22. A data transmission system according to claim 18, wherein said first and second-type information signals are represented by two states of a binary signal, respectively, and said first type information signal is of a type which may involve a dangerous state of the train if the signal were erroneously transmitted, while said second type information signal is of a type which involves no dangerous state of the train in any event.

* * * * *